United States Patent [19]

Rhyne et al.

[11] Patent Number: 5,511,135
[45] Date of Patent: Apr. 23, 1996

[54] STYLUS-INPUT RECOGNITION CORRECTION MANAGER

[75] Inventors: James R. Rhyne, New Canaan, Conn.;
Nicos J. Anthony, Purdys, N.Y.;
Stephen E. Levy, Valhalla, N.Y.;
Catherine G. Wolf, Katonah, N.Y.

[73] Assignee: International Business Machines Corporation, Armonk, N.Y.

[21] Appl. No.: 159,008

[22] Filed: Nov. 29, 1993

[51] Int. Cl.⁶ .................................................. G06K 9/03
[52] U.S. Cl. .......................... 382/187; 382/311; 395/650
[58] Field of Search ........................ 382/13, 59, 57, 382/187, 309, 310, 311; 345/175, 179, 180–183; 364/705.03, 709.11, 709.01; 395/650

[56] References Cited

U.S. PATENT DOCUMENTS

| | | | |
|---|---|---|---|
| 4,672,677 | 6/1987 | Yamakawa | 382/13 |
| 4,679,241 | 7/1987 | Lukis | 382/13 |
| 4,703,511 | 10/1987 | Conoval | 382/13 |
| 4,727,588 | 2/1988 | Fox et al. | 382/13 |
| 4,878,249 | 10/1989 | Mifune et al. | 382/13 |
| 4,926,491 | 5/1990 | Maeda et al. | 382/14 |
| 4,972,496 | 11/1990 | Sklarew | 382/13 |
| 5,109,510 | 4/1992 | Baker et al. | 395/650 |
| 5,148,155 | 9/1992 | Martin et al. | 345/179 |

FOREIGN PATENT DOCUMENTS

| | | |
|---|---|---|
| 61-18081 | 1/1986 | Japan . |
| 61-86883 | 5/1986 | Japan . |
| 61-148586 | 7/1986 | Japan . |
| 61-150081 | 7/1986 | Japan . |

OTHER PUBLICATIONS

Katoh et al., "Template Addition Method for Character Recognition", IBM Technical Disclosure Bulletin, vol. 33, No. 4, pp. 112–116, Sep. 1990.

*Primary Examiner*—Joseph Mancuso
*Assistant Examiner*—Larry J. Prikockis
*Attorney, Agent, or Firm*—Sterne, Kessler, Goldstein & Fox; Robert P. Tassinari

[57] ABSTRACT

The invention relates to a stylus-based user interface for computers. It describes a process for separating a stylus-based application program from the procedures used to implement stylus-based, user driven error correction processes. This separation allows error correction procedures to be used by many applications, providing consistency in the user interface and saving application development costs through reuse of these procedures.

7 Claims, 5 Drawing Sheets

STYLUS-INPUT RECOGNITION CORRECTION MANAGER

TECHNICAL FIELD

The present invention relates generally to stylus-based user interface for a computer and, more particularly, to a method and apparatus for providing a standard interface between a stylus-based application program and a handwriting recognizer. Even more particularly, the present invention relates to a method and apparatus for enabling application programs that rely on a stylus-input to be designed without dependencies on the specific interfaces of stylus-input recognizers.

BACKGROUND ART

Computer systems which accept data streams generated by operating a stylus are becoming commonplace. A stylus-based user interface generally comprises a pen (called a stylus) and a digitizing tablet. In many application programs, stylus-based user interfaces are superior to keyboards as a means for entering data. Such is the case, for instance, when a user of the computer has only one hand available for data entry. Other cases include, but are not limited to, those in which a keyboard would add too much bulk or weight to a data processing system designed to be highly portable or the case of a system designed for operation by a user who does not know how to or is physically unable to type.

Referring to FIG. 1, an application program 105 which receives a stylus-based input is called a stylus-based application programs (SBAPP) 105. The SBAPP 105 is designed and operated within a stylus-based system environment (SBENV) 100. The SBENV 100 comprises hardware and software components that are needed to capture, display and recognize handwriting input, and to display and if necessary correct results derived from incorrect recognition of the handwriting input. More specifically, the SBENV 100 comprises a pen 110, a digitizing tablet 120, a display device 130 (which may be integrated with the digitizing tablet), an operating system 140, tablet and display device drivers 150, a "stylus-aware window system" 160, one or more handwriting recognizers 170, and a set of error correction procedures 180.

Compared to an input data stream from a keyboard or mouse, an input stream from a stylus-based user interface is more difficult for the system to interpret and makes the development of stylus-based application programs very complex. The input stream of a keyboard or mouse (generally) unambiguously reflects a user's intention, that is, to select a particular keyboard key or mouse button. The application program may or may not be able to respond meaningfully to that particular input data, but the input data itself is clear. The SBENV 100, on the other hand, functions as a source of both character data (such as text, function keys and editing commands) and gesture data (i.e., mouse data such as pointing and selecting).

The input data stream of a stylus-based user interface consists of a sequence of (x,y) coordinate pairs which describe the locus of the stylus as the user writes. A "stroke" is a subsequence of (x,y) pairs, delimited by "pen-down" and "pen-up" events. A pen-down event occurs when the stylus first touches the digitizing tablet. A pen-up event occurs when the stylus next leaves the digitizing tablet.

A sequence of strokes may define a letter or a word. If so, the handwriting recognizer 170 receives the sequence of strokes and generates from it a sequence of codes (e.g., ASCII codes) as output for the recognized result. Alternatively, a sequence of strokes may define a "gesture". In the context of handwriting recognition and error correction, a gesture is analogous to an editing command. For example, a horizontal line drawn over a displayed word may be interpreted as a request to delete that word and the space it occupies. An elliptical loop around a word may imply a request to edit that word, possibly causing it to appear in an "editing window". The distinction between one sequence of strokes being a gesture and another sequence being a letter or a word depends on such factors as the shape and size of the strokes and the context in which they arise.

If the sequence of strokes defines a gesture, the handwriting recognizer 170 receives the sequence and generates from it a structure which comprises a gesture code (to identify the gesture, e.g., a horizontal line) and an ordered set of points, referred to as "semantic points" or "hot points", which are used in the interpretation of the gesture as a command (the leftmost and rightmost points of a horizontal line determine the domain of the command, i.e., which letters and how much space will be removed).

The stylus-aware window system 160 is a conventional window system (one which relies on keyboard and mouse for user interface interactions, e.g., X Windows, OS/2 PM, Microsoft windows) which has been enhanced to support a stylus through mouse emulation and special "writing windows" in which a user can write and draw. Mouse emulation is used in all non-writing windows. For example, a program in a menu window may be "selected" by tapping the stylus once over the displayed program name; tapping once more may activate the selected program. Writing and drawing within a writing window produces stroke sequences which need to be processed by the handwriting recognizer 170.

The handwriting recognizer (HWR) 170 translates the user's natural writing (captured as a sequence of strokes) into a corresponding code set (e.g., ASCII). The handwriting recognizer 170 may be initiated to perform recognition when some event occurs. For example, the user changes from one writing window to another; or there is a timeout on new writing, i.e., no stroke has been drawn by the user for a sufficiently long time. Alternatively, recognition may be constantly active in the background. This allows the stylus-based system to support concurrently writing new strokes, recognizing received completed strokes, and displaying recognition results. As the user writes and generates strokes, they are sent to the application program 105 which passes them to the handwriting recognizer 170.

The handwriting recognizer 170 interprets these strokes using spatial and temporal considerations, generates a response such as "No Result Yet", "Result Available", or "Don't Know", and sends that response, packaged within a structure, to the application program 105. While all these computations are occurring, the user may be writing and generating new strokes. These strokes will be received by the application program 105. The application program 105, in turn, sends the strokes to the handwriting recognizer 170. The handwriting recognizer 170 then attempts to interpret the strokes.

Occasionally handwriting recognizers produce incorrect results. When this happens the user needs to edit the incorrect symbols using stylus-based editing procedures (as he or she would do in a keyboard-mouse environment by using keyboard-mouse editing procedures).

Ordinarily, error corrections are initiated by the user through stylus-based protocols. These protocols will be referred to as "error correction procedures" (ECPs) 180.

Each ECP 180 entails a well defined set of stylus-based dialogs through which the user completes desired error corrections. Some ECPs which the user can employ involve:

- Selection from a list of possible alternative code sequences which may be associated readily with the particular code sequence that is targeted for correction. The alternatives may be produced either by the handwriting recognizer or may be assembled by the user through observation of handwriting recognizer errors;
- rewriting the incorrectly recognized code sequence;
- the use of "gestures", which are interpreted as traditional editing commands like insert, delete, replace, etc.; For example, to replace two characters, the user might draw a line through the characters and handwrite the replacement characters. To insert a missing character, the user might make a caret where the character is to be inserted, and handwrite the character;
- the use of code menus, e.g., a keyboard displayed on the screen; or
- use of a combination of methods, such as marking a character to be replaced with a line gesture and typing the replacement character with a displayed keyboard.

A user may activate more than one ECP 180 to complete correction of some recognizer output. The application program 105 first receives the result from the handwriting recognizer 170. The user initiates error correction after the result is displayed via display device 130 by the application program 170.

There may be cases where the handwriting recognizer 170 is not able to produce a preferred interpretation for a sequence of strokes. The handwriting recognizer 170 may produce several likely possibilities. In such cases, multiple results may be presented to the user, thus requiring the user to select from a set of possible interpretations, or force a specific interpretation. This process is termed "weak recognition correction." It differs from regular error correction in that the need for user editing is established (by the handwriting recognizer 170) before the result is given to the application program 105.

In the SBENV 100 just discussed, the application program 105 deals directly with the handwriting recognizer 170, in fact with all recognizers which it may be using. This causes considerable complexity in the application program 105 since handwriting recognizers 170 are complex functional packages with correspondingly complex usage interfaces. Moreover, changes in the handwriting recognizer's 170 application programming interface (not shown) will usually require changes within the application program 105.

Moreover, application developers create specific error correction procedures for each application program. Stylus-based application development environments, such as Windows for Pen Computing (Microsoft Corp.) and PenPoint (Go Corp.), provide user interface procedures for pen entry, for pen activated buttons and menus, and for pen operated simulated keyboards, but do not provide procedures for error correction.

There are a small number of stylus-based, user-driven error correction paradigms, and it would be desirable to have these implemented as a code library. However, they must be independent of the application presentation processes, as these are application specific. Unfortunately, many of the error correction paradigms require the user to identify the erroneous results by pointing at them on the display. Thus, the error correction library procedures and the application must cooperate through an application independent protocol. Also, the error correction procedures may need to receive, recognize, and process strokes while they are active. These strokes will be diverted from the application.

The burden of complexity and maintenance on the application program 105 due to support of the handwriting recognizer's 170 external interface (not shown) increases if the ECPs 180 are integrated within the application program 105. This occurs because some ECPs 180 use the handwriting recognizer 105 and, therefore, they are affected by changes in the handwriting recognizer's 170 external interface, directly or indirectly.

The difficulty in writing application programs given the above problems has limited the marketability of SBENVs. Therefore, what is needed is a system that allows application programs that rely on a stylus-input to be designed without dependencies on the specific interfaces used by the stylus-input handwriting recognizers and the error correction modules.

DISCLOSURE OF THE INVENTION

The present invention provides a stylus-based used interface for computers. Disclosed herein is a process for separating a stylus-based application program from the procedures used to implement stylus-based, user driven error correction processes. This separation allows error correction procedures to be used by many applications, providing consistency in the user interface and saving application development costs through reuse of these procedures.

The invention provides an interface termed a Stylus-Input Correction Manager (SIRCOM) that operates within a stylus-based system environment (SBENV). It encapsulates logic and data structures to provide interfaces for stylus-input application programs, handwriting recognizers, and error correction modules. Thus allowing these components to be designed without dependencies on the external interfaces of the other components.

More particularly, the application program may be designed to be independent of the mechanics of handwriting recognizers, and the training and/or adaption of handwriting recognizers. Moreover, the SIRCOM interface enables the application program to be designed to remain independent of any error correction procedures which, through specific error correction protocols and cooperation with stylus-input handwriting recognizers, are able to correct recognition results, and train and adapt the stylus-input handwriting recognizers.

The SIRCOM is composed of three, cooperating functions: (1) a Stroke Router; (2) a Recognition Manager; and (3) a Mediator. The SIRCOM manages these three functions and coordinates their activities.

The Stroke Router has two modes. In its normal mode, strokes which are received are sent to the recognizer manager for storage and processing by the handwriting recognizer. In its error mode, strokes are routed to an auxiliary SIRCOM which is associated with the error correction procedure. The auxiliary SIRCOM typically sends these forwarded strokes to its recognition manager for storage and recognition, and processing by the error correction procedure. This diversion of strokes allows the error correction procedure to process strokes which are made in the application window.

The Recognition Manager stores strokes, causes them to be recognized, and relays the recognized results back to the application program. It is essential that the strokes be stored, so that they can be retrieved by the error correction procedure and displayed and edited by the user as strokes, or sent to the handwriting recognizer as training material.

The Mediator implements a protocol between the application program and the error correction procedure which allows the error correction procedure to retrieve the recognition results displayed by the application program in a region of its window. Through this protocol, the error correction procedure may inform the application that there are revised results from error correction, so that the application program can make the appropriate corrections to its displays.

BRIEF DESCRIPTION OF DRAWINGS

The foregoing and other features and advantages of the invention will be apparent from the following more particular description of a preferred embodiments of the invention, as illustrated in the accompanying drawings, in which.

BEST MODE FOR CARRYING OUT THE INVENTION

Figure 1:
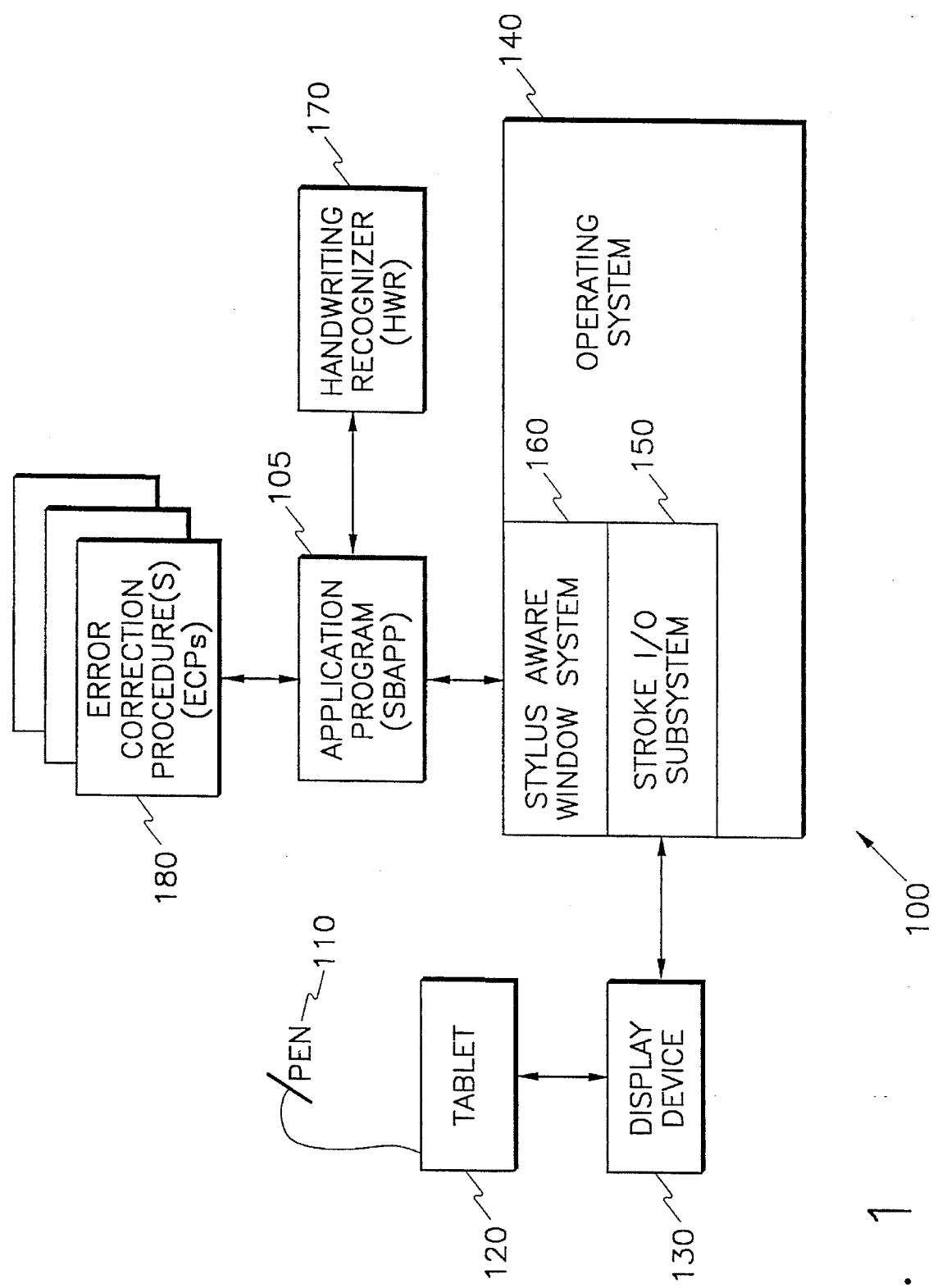
FIG. 1 is a block diagram of the hardware and software environment used in conventional systems for supporting stylus-based input.
Figure 2:
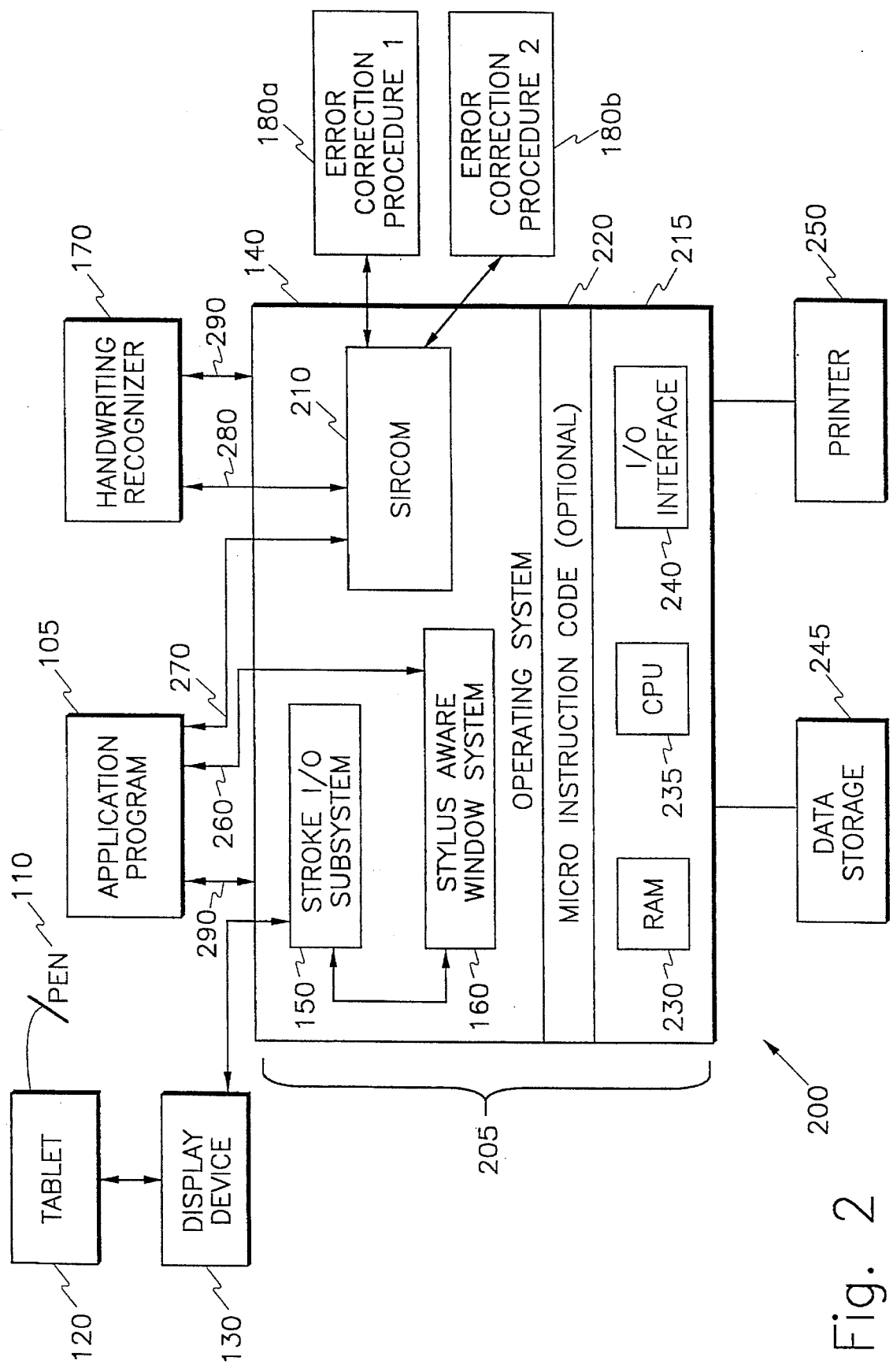
FIG. 2 is a block diagram of the hardware and software environment of the present invention, including a stylus-input correction manager.

FIG. 2 is a block diagram of a stylus-based system environment (SBENV) 200 in which a preferred embodiment of the present invention operates. The preferred embodiment of the present invention includes a stylus-based application program (SBAPP) 105. The application program operates on a computer platform 205. The computer platform 205 includes a hardware unit 215 which includes a central processing unit (CPU) 235, a random access memory (RAM) 230, and an input/output interface 240. The computer platform 205 includes an operating system 140, and may include micro-instruction code 220. Various peripheral components may be connected to the computer platform 205, such as a display device 130, a data storage device 245, and a printing device 250.

In a preferred embodiment of the present invention, the computer 205 is any personal or mainframe computer. The operating system 140 may be any operating system compatible with the computer 205 being utilized.

The SBENV 200 comprises hardware and software components that are needed to capture, display and recognize handwriting input, and to display and if necessary correct results derived from incorrect recognition of the handwriting input. More specifically, the SBENV 200 comprises a pen 110, a digitizing tablet 120, a display device 130 (which may be integrated with the digitizing tablet), an operating system 140, tablet and display device drivers 150, a "stylus-aware window system" 160, one or more handwriting recognizers 170, and a set of error correction procedures 180.

Those skilled in the art will readily understand the equivalents to the above structure.

The present invention is directed to a stylus-input recognition correction manager (SIRCOM) 210. The SIRCOM 210 is an external programming interface that operates within the stylus-based system environment (SBENV) 200. The data structures and programming logic which demonstrate how the SIRCOM 210 is designed and implemented within the SBENV 200 are described below. Following an overview of the general operation of the SIRCOM 210, its major elements are more fully described.

Referring to FIG. 2, the SBENV components which interact with the SIRCOM 210 during SBAPP 105 execution are shown. When the SBAPP 105 is first activated it directs the SIRCOM 210 to set up and initialize itself and passes parameters to it which will govern its behavior during its interactions with the SBAPP 105 and the HWR 170. For example, the SBAPP 105 will pass to the SIRCOM 210 the name of the HWR 170 which it will use, and the name of the SBAPP result handler (not shown) to which the SIRCOM 210 will deliver recognizer results as it receives them.

Line 260 depicts the interface through which SBAPP 105 receives the strokes that are produced by the user on the LCD I/O tablet 120. It is also the path through which handwritten strokes are displayed by the SBAPP 105. Line 290 represents the interface for traditional operating system services, e.g., memory allocation, I/O support, and so on. Lines 260 and 280 depict the interface provided by SIRCOM 210 (discussed in detail below).

Referring to FIG. 4A, a user writes the address "1201 Yardley Rd." within the writing window W. Some event (e.g., a timeout or selection of a "Recognition" button) causes the entire stroke sequence to be sent to the HWR 170. The HWR 170 processes the strokes, converting them into a corresponding ASCII string. The SBAPP 105 receives the ASCII string, erases the strokes, and displays the corresponding ASCII text in the window W, shown in FIG. 4B.

The user in the scenarios of FIGS. 4A, 4B, and 4C is a single instance of the writing window W. Since nothing unusual or unexpected occurs during writing and recognition, window W remains the primary window throughout the execution life of the example. Correspondingly, a single instance of the SIRCOM 210 suffices to accept and route input from window W to a single instance of the HWR 170 and output from the HWR 170 to the SBAPP 105.

Figure 4:
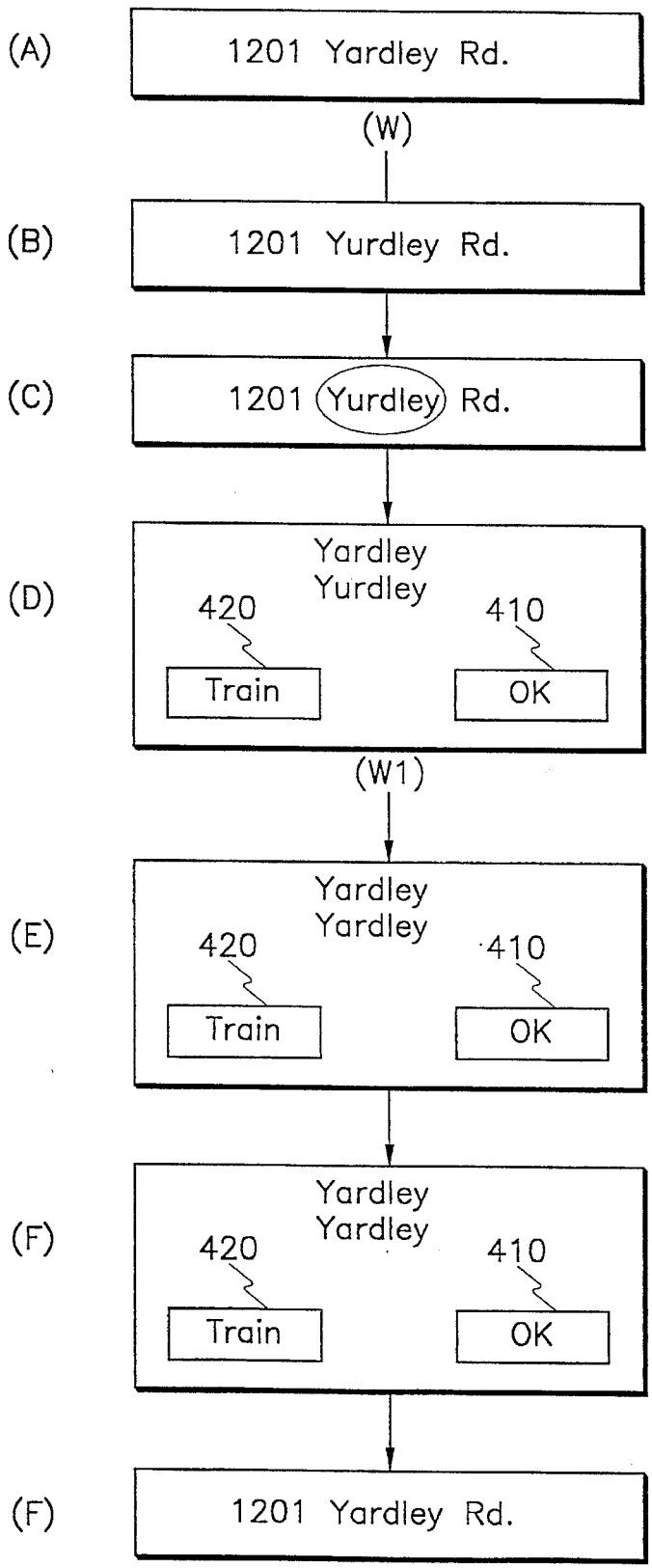
FIGS. 4(A) through 4(G) show an example of correcting a handwriting recognition error in accordance with the present invention.

In the example in FIG. 4, the character "a" in "Yardley" is recognized as "u". The user initiates error correction in FIG. 4C by selecting the word to be corrected with a circular stroke.

The circular stroke is recognized by the HWR 170 and the result (i.e., the circular gesture) is returned to the SBAPP 105. The SBAPP 105 erases the circular stroke and the gestural error correction procedure (GSECP or ECP) 180 is activated. When the GSECP 180 is activated, the user interface changes. A new writing window W1 appears and becomes the primary writing window, as shown in FIG. 4D. The window contains the original handwriting strokes for the selected word, the recognized results, and various function buttons.

Figure 5:
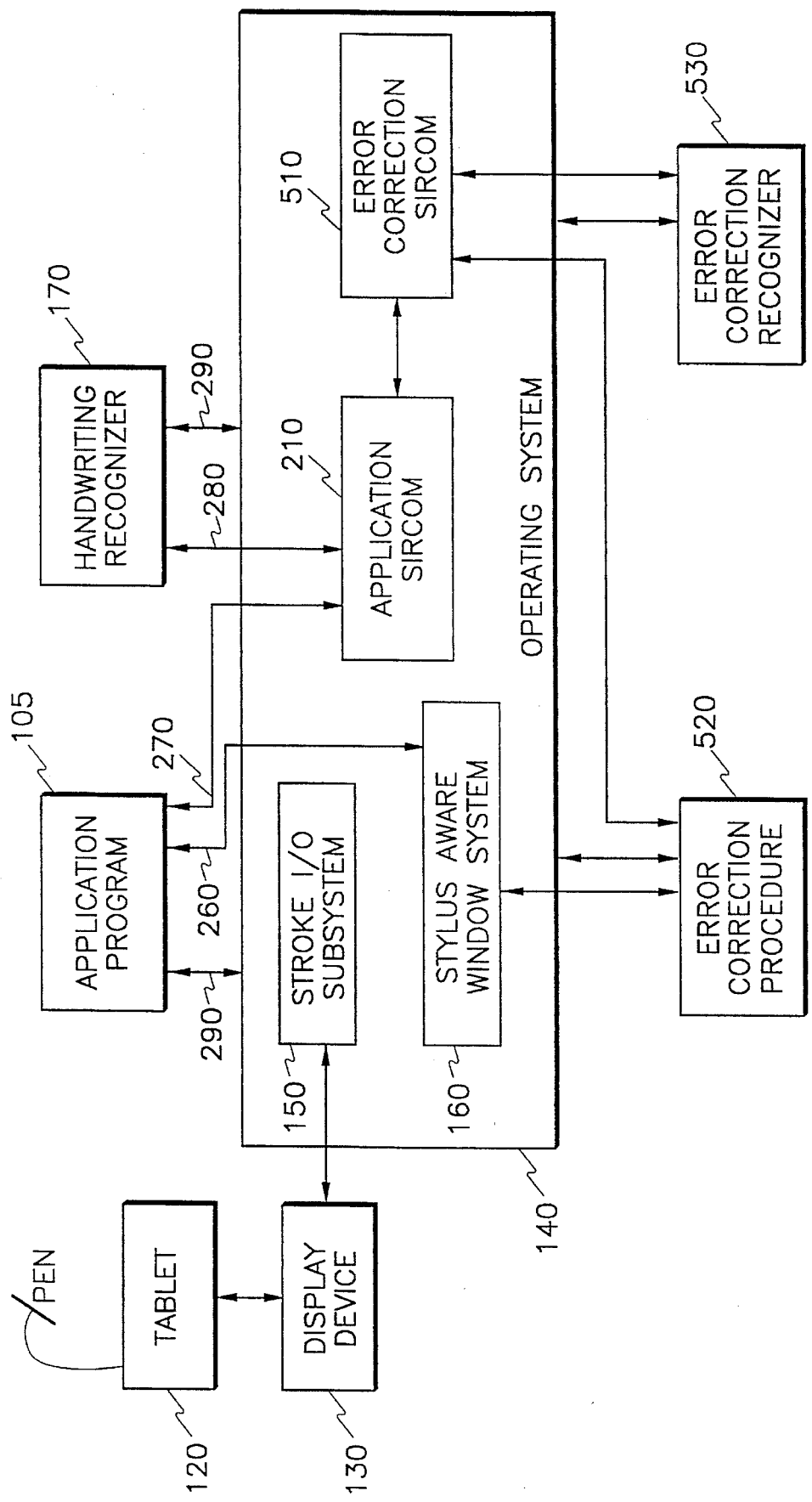
FIG. 5 shows the creation of multiple instances of the stylus-input correction manager.

As a procedure, the GSECP 180 is considered a functional component that is logically separate from the SBAPP 105. Once activated, the GSECP 180 becomes the component that first sees the strokes which the user makes within W1. GSECP 180 also directs the SIRCOM 210 to create a new instance of itself. It is this SIRCOM instance which will communicate with the GSECP 180, the HWR(s) 170, and any other ECP(s) 180 which may be activated, as shown in FIG. 5.

The new SIRCOM instance is initialized to communicate with the stroke input handler in GSECP for W1, to route strokes from this handler to a designated HWR instance, and receive and route HWR results to a specified result handler in GSCEP for W1. This operation is analogous to each of the operations in FIGS. 4A, 4B, and 4C, except that a different window, SIRCOM, and possibly HWR instance are involved.

In window W1 of FIG. 4E, the user writes "a" over the misrecognized character. The strokes are sent to the SIRCOM 210 which will route them to the HWR 170.

When the HWR 170 has a result, it sends it to the SIRCOM 210 which returns it to the result handler for GSECP 180. The result is displayed in W1, shown in FIG. 4F. The user trains the recognizer to recognize the original strokes for "a" as the ASCII character "a" by touching the "Train" button 420.

The user accepts the result and dismisses window W1 by selecting the "OK" button 410. The SIRCOM 210 places the ASCII string for "Yardley" at a location specified by the previous (parent) SIRCOM instance, destroys W1, the latest SIRCOM and HWR instances, and exits to the parent SIRCOM instance.

The parent SIRCOM instance prepares and sends a command to the SBAPP to insert the word "Yardley" at the location specified by the circular gesture used to select the to-be-corrected word (see FIG. 4C). The corrected result is displayed in window W, shown in FIG. 4G.

During the execution life of the SBAPP 105 there may be several SIRCOM instances that are created. Some will be created because the correction of an error requires a new writing window, as suggested in the above example. Other SIRCOM instances may be created by the SBAPP 105 at different points during its execution path. Error correction procedures (on behalf of the SBAPP 105) may also cause SIRCOM instances to be created. In general, there may be multiple instances of the SIRCOM 210, and the stroke input presentation components (e.g., windows W, W1 in the above examples) for the SBAPP 105 and the ECP(s) 180.

Figure 3:
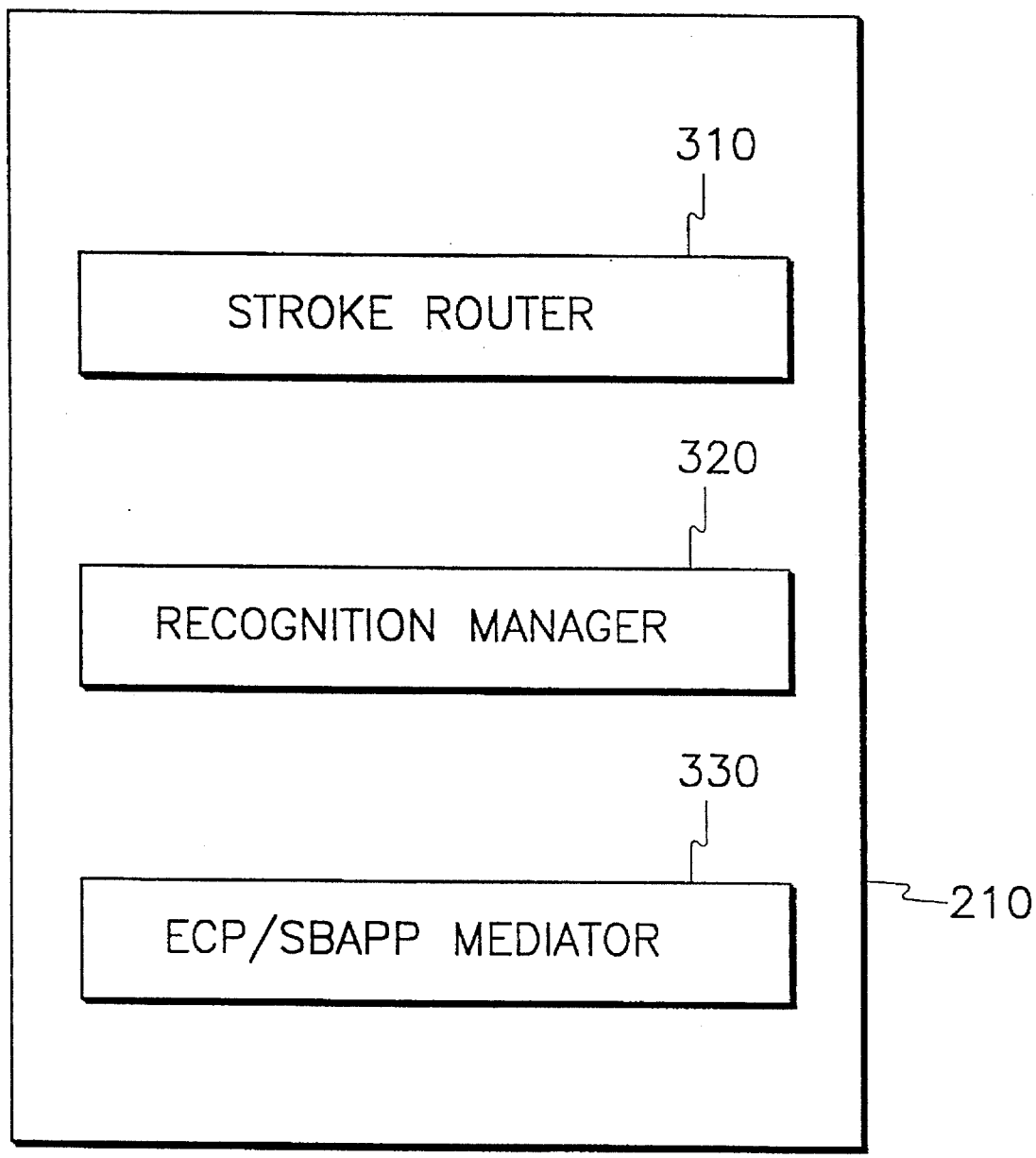
FIG. 3 is a block diagram of the components of the stylus-input correction manager.

Referring to FIG. 3, the SIRCOM 210 is composed of three, cooperating functions: (1) a Stroke Router 310; (2) a Recognition Manager 320; and (3) a ECP/SBApp mediator 330. The SIRCOM 210 manages these three functions and coordinates their activities.

The Stroke Router 310 has two modes. In its normal mode, strokes which are received are sent to the recognizer manager 320 for storage and processing by the HWR 170. In its error mode, strokes are routed to an auxiliary SIRCOM which is associated with the ECP 180. The auxiliary SIRCOM will typically send these forwarded strokes to its recognition manager 320 for storage and recognition, and processing by the ECP 180. This diversion of strokes allows the ECP 180 to process strokes which are made in the application window, e.g., whose function is to point to application displayed results which need to be corrected.

The Recognition Manager 320 stores strokes, causes them to be recognized, and relays the recognized results back to the SBAPP 105. It is essential that the strokes be stored, so that they can be retrieved by the ECP 180 and displayed and edited by the user as strokes, or sent to the HWR 180 as training material. Timeouts and other well known techniques control the endless buildup of stored strokes.

The ECP/SBAPP Mediator 330 implements a protocol between the SBAPP 105 and the ECP 180 which allows the ECP 180 to retrieve the recognition results displayed by the SBAPP 105 in a region of its window. Through this protocol, the ECP 180 may inform the application that there are revised results from error correction, so that the SBAPP 105 can make the appropriate corrections to its displays.

The SIRCOM 105 itself mediates the interactions among its components, and creates and destroys auxiliary SIRCOMs as needed to support active ECPs.

The SIRCOM functions will be presented in a typical order of their use in an application. Note that the functions labeled as external are functions that the SBAPP 105 and the ECP 180 use, while the functions labeled as internal are functions that are only used between the three components of the SIRCOM 210.

SIRCOM_Create [External:SIRCOM 210]: The SBAPP 105 begins by creating one or more SIRCOM instances to mediate interactions with the stylus in its various windows. These SIRCOM instances will be called SBAPP-SIRCOMs to distinguish them from ECP-SIRCOM instances discussed below. The creation function is part of the SIRCOM 210 itself. It returns an ID for the SIRCOM 210, which must be used in all subsequent requests to the SIRCOM 210. The creation function accepts three primary groups of parameters:

AppPars identifies the application resources and procedures to be used by the SIRCOM 210. These include IDs of application windows, application procedures used to report recognition results, and application procedures used to report recognition result changes.

RecoPars identifies the recognition package (i.e., HWR 170) to be used and supplies the resource ID for the recognizer configuration resources.

ECPPars identifies the set of error correction procedures to be used by the SIRCOM instance, and the resource ID for their configuration resources. Additionally, they define SIRCOM behavior when the recognizer reports a recognition error (e.g., the recognizer is unable to distinguish between two or more equally plausible results).

SIRCOM_Process_Strokes [External:Stroke Router 310]: The SBAPP uses this function to pass strokes to the SBAPP-SIRCOM instance associated with the window in which the strokes are made. The function will normally route the stroke to the configured HWR 170. If the HWR 170 produces a result, the Recognition Manager 320 will notify the application's SBAPP_Reco_Results procedure (described below) identified in the AppPars parameter to the SIRCOM_Create function for this SIRCOM instance. Alternatively, when the SIRCOM is in error mode (viz. SIRCOM_Enter_Error_Mode (described below)), this function routes strokes to the SIRCOM_Process$_{13}$Strokes function of the ECP-SIRCOM, allowing the strokes to be processed by the ECP. This function accepts two groups of parameters:

StrokePars contains one or more strokes, together With directions for their recognition (including the possibility of no recognition).

SIRCOM ID identifies the SIRCOM instance which is to process these strokes.

SIRCOM_RecoStrokes [Internal:Recognition Manager 320]: This function accepts a set of strokes from the Stroke Router 310, assigns stroke IDs to them, stores them indexed by the stroke IDs, and passes them to the HWR 170. Its parameter is the set of strokes passed in to the Stroke Router 310.

SBAPP_Reco_Result [External:Recognition Manager]: This procedure is supplied by the SBAPP 105 and is invoked whenever the SIRCOM recognizer has results for the SBAPP 105. The function will typically cause the results to be displayed, and associate the result ID with the display region containing the results display. Its parameters include:

The SIRCOM ID of the SIRCOM producing the recognition results.

The IDs of the results. The SBAPP 105 must associate these IDs with the display of the results. For example, if the result is a word that is displayed in region ((100,200),(160,225)) of the window, a query from the SIRCOM 210 for results in a region specified by ((90,190), (170,230)) must return the result ID associated with this word.

The Recognition Manager 320 provides the SBAPP 105 services to retrieve the character string, gesture ID, or shape ID of the recognized result. These services are similar to those provided by the recognition API in Penpoint™ and Windows for Pen Computing™, and for the sake of brevity, a detailed description of these services will not be given.

SIRCOM__Enter__Error__Mode  [External:SIRCOM 210]: This function is invoked when the SBAPP 105 detects a recognition error, or when the user signals, via an application dialog, that error correction is to be performed. It creates a SIRCOM instance that is a child of the SBAPP-SIRCOM instance, and invokes an ECP 180 with the SIRCOM child instance. The parent SIRCOM Stroke Routing Manager 310 is told to route strokes to the ECP-SIRCOM instead of to the HWR 170. The function takes three parameters:

The SIRCOM ID of the SIRCOM which is to be put in error mode.

An optional specification of the ECP 180 to be invoked for error correction and the configuration parameters for the ECP invocation. If this parameter is not supplied, a default ECP and configuration will be used from the information specified when the SIRCOM instance was created.

An optional list of the ID of recognition results that are presumed to be in error. If this is not supplied, the ECP 180 will engage the user in a dialog to determine them. This dialog will require the user to select results displayed by the SBAPP 180 in the application window. The strokes which are part of this dialog will be presented to the SIRCOM 210 by the SBAPP 105, but routed to the ECP SIRCOM for handling.

The ECP 180 will construct a selection region and use the SBAPP__Find__Results function to retrieve the result IDs from the SBAPP 105.

The ECP 180 has access to the SBAPP window in which the results were displayed, as this information is stored in the SIRCOM 210 when it was created. Thus, the ECP 180, at its option, may (a) highlight the results to be corrected in the SBAPP window, (b) create a new window and redisplay the results there, or (c) engage the user in a selection dialog in the SBAPP window to identify the results needing correction. The ECP 180 may use the following SBAPP 105 provided function to retrieve Result IDs from the SBAPP 105.

SBAPP__Find__Reco__Results  [External:ECP/SBAPP Mediator 330]: This function accepts a list of regions, and returns the list of result IDs which the SBAPP 105 has displayed in those regions of the window. Alternatively, it accepts a list of result IDs, and returns a list of regions in which those results were displayed. The function has four parameters:

The ID of the SIRCOM 210 in whose context the results were created and given to the SBAPP 105.

The list of regions to be searched for results, together with flags indicating whether it is OK to return result IDs of results falling only partially in the regions. This parameter may be null, in which case the following parameter must not be null.

The list of result IDs whose display regions are to be found and returned. This parameter may be null, in which case the preceding parameter may not be null.

The list of result ID and region pairs for the union of those results found by searching the supplied list of regions, and those results whose IDs are supplied.

The ECP 180 may now engage the user in one or more of the previously described error correction protocols. The ECP 180 also has access to the previously mentioned service functions for retrieving the original recognition results. The ECP may re-recognize the strokes by accessing the SBAPP-SIRCOM recognition manager 320 functions for this purpose. It may construct a new sequence of strokes, possibly including some strokes originally in the recognized results, and have this recognized by the SBAPP-SIRCOM recognition manager 320. It may create a new result associated with the original result's strokes, and force training of the HWR 170 with these new results.

Recall that the ECP 180 has its own ECP-SIRCOM, which is a child of and has access to the SBAPP 105 created SIRCOM 210. This ECP-SIRCOM has its own HWR 170, which may differ in operation and/or configuration from that in the SBAPP 105 created SIRCOM 210. This feature allows the ECP 180 to use a consistent set of recognized gestures, shapes, and characters independent of the SBAPP's 105 choices. It allows the system designer to provide ECPs 180 whose interface is consistent across SBAPPs 105.

Eventually, the ECP 180 will signal the SBAPP 105 that it has revised recognition results available.

SBAPP__Revise__Results [External:ECP/SBAPP Mediator 330]. This function notifies the SBAPP 105 that revised recognition results are available. The SBAPP 105 may accept these results and alter its display, or it may reject them. If it accepts the revised results, the ECP 180 and ECP-SIRCOM are destroyed, and the SIRCOM 210 exits from error mode, restoring the stroke routine to the SIRCOM recognition manager 320. If the SBAPP 105 rejects the revised results, the ECP 180 will notify the user and allow additional corrective actions to be taken. The function has three parameters:

The SIRCOM ID of the SBAPP-SIRCOM providing the revised results.

The IDs of the original results.

The IDs of the new results.

When the SBAPP 105 is preparing to terminate, it must terminate the operation of its SIRCOMs by using the following function for each SIRCOM it created.

SIRCOM__Terminate [External: SIRCOM 210]. This function requires a single parameter which is the ID of the SIRCOM to be terminated.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new and desire to secure by Letters Patent is:

1. A computer-based system referred to as a stylus-input recognition correction manager comprising:

(a) a stroke router for receiving strokes from an application program, said stroke router having a first and a second mode of operation;

(b) a recognition manager, connected to said stroke router, for storing said received strokes, for passing said received strokes to a handwriting recognizer for recognition, and for relaying said recognized strokes from said handwriting recognizer back to said application program; and (c) a mediator for implementing a protocol between said application program and an error correction module, said protocol having means for facilitating retrieval of said recognized strokes by said error correction module from said application program;

wherein said first mode of operation of said stroke router routes said received strokes to said recognition manager, and wherein said second mode of operation of said stroke router routes said received strokes to said error correction module through an auxiliary stylus-input recognition correction manager, said auxiliary stylus-input recognition correction manager being an instance of the stylus-input recognition correction manager, wherein the stylus-input recognition correction manager provides an interface among said application program, said handwriting recognizer, and said error correction module.

2. The stylus-input recognition correction manager of claim 1, wherein said auxiliary stylus-input recognition correction manager includes means for sending said received strokes to a recognition manager associated with said auxiliary stylus-input recognition correction manager for storage and recognition, and processing by said error correction module.

3. The stylus-input recognition correction manager of claim 1, wherein said error correction module includes means for informing the application program via said mediator that there are revised strokes to be displayed.

4. A computer-based system for processing stylus-input comprising:

(a) a stylus-input recognition correction manager for managing a stroke router, a recognition manager, and a mediator;

(b) a stylus-based application program, operating on a computer platform and connected to said stylus-input recognition correction manager, that accepts handwritten strokes as input;

(c) a handwriting recognizer, connected to said stylus-input recognition manager, that recognizes said handwritten strokes; and (d) an error correction module, connected to said stylus-input recognition manager, for correcting errors in said recognized handwritten strokes, wherein said stylus-input recognition correction manager provides an interface among said application program, said error correction module, and said handwriting recognizer, and wherein said stroke router receives said handwritten strokes from said application program, said stroke router having a first and a second mode of operation, wherein said first mode of operation routes received strokes to said recognition manager for storage and processing by said handwriting recognizer, and said second mode of operation routes said received strokes to said error correction module through an auxiliary stylus-input recognition correction manager, said auxiliary stylus-input recognition correction module being an instance of said stylus-input recognition correction module.

5. The system of claim 4, wherein said recognition manager is connected to said stroke router, and includes means for storing said received strokes, for passing said received strokes to said handwriting recognizer for recognition, and for relaying said recognized strokes from the handwriting recognizer back to said application program.

6. The system of claim 5, wherein said mediator includes means for implementing a protocol between said application program and said error correction module, said protocol having means for facilitating retrieval of said recognized strokes by said error correction module from the application program.

7. The stylus-based system environment of claim 4, further comprising a pen, a digitized tablet, and a display device.

* * * * *